Feb. 5, 1957

A. S. VOLPIN 2,780,233

THROUGH CONDUIT GATE VALVE

Filed March 6, 1951

Inventor
Alexander S. Volpin
BY
ATTORNEY

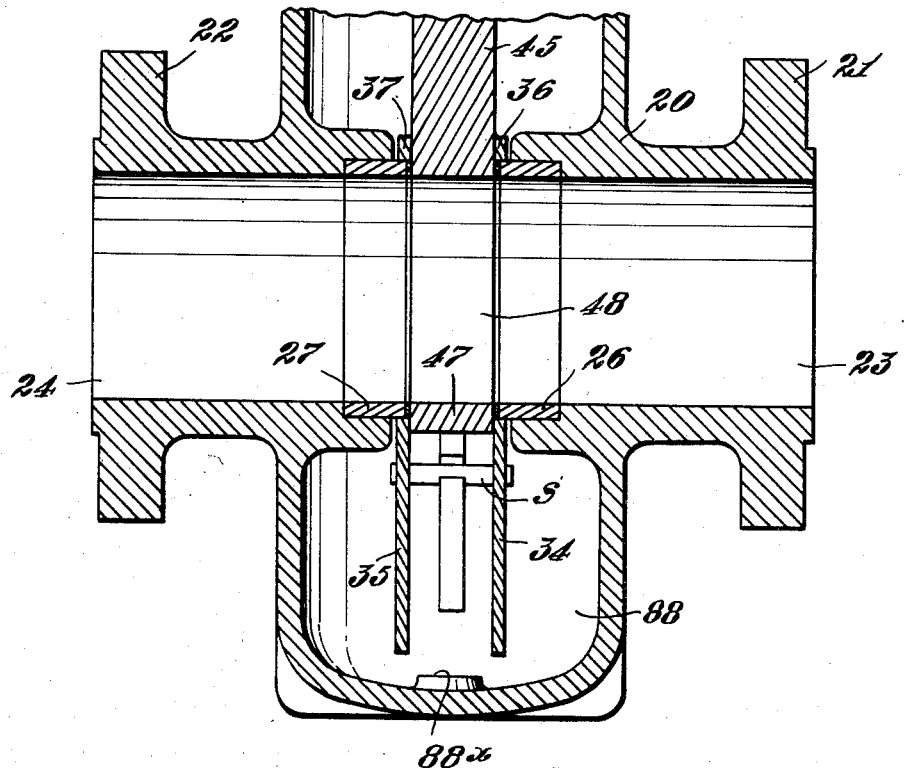
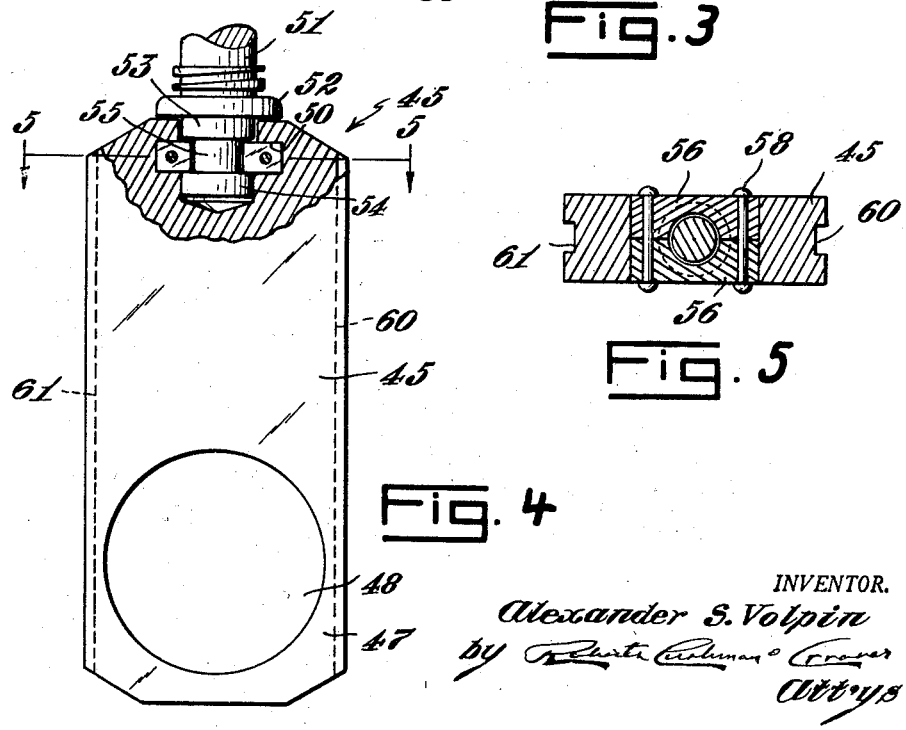

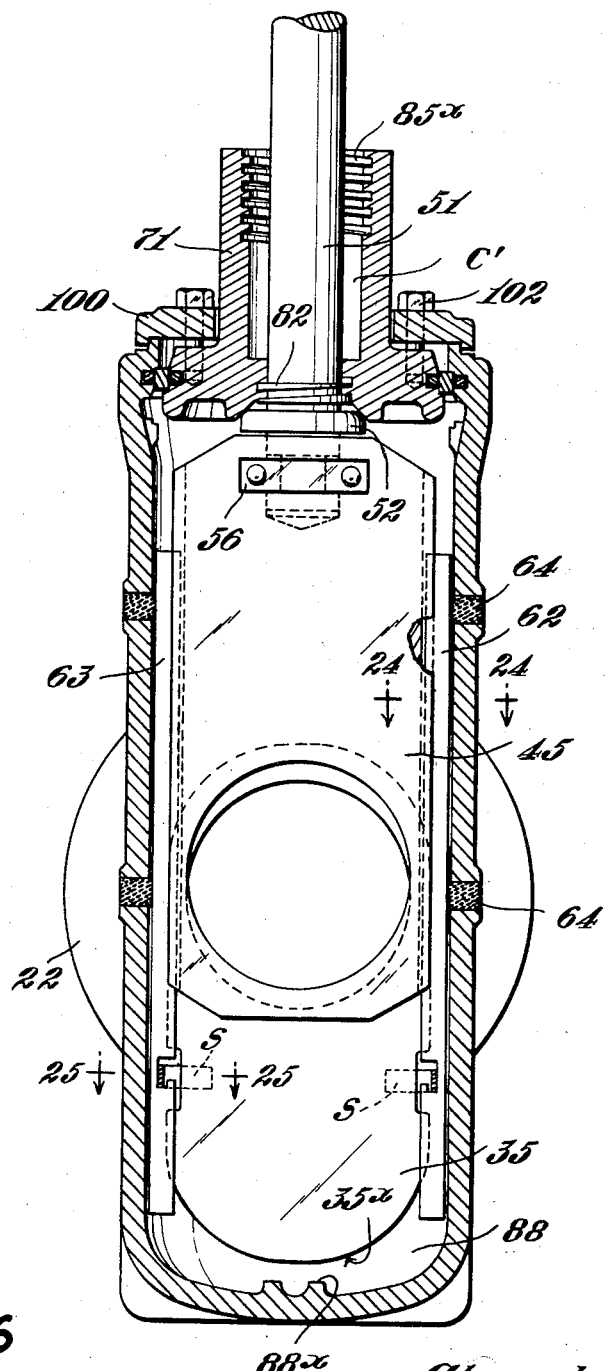

United States Patent Office 2,780,233
Patented Feb. 5, 1957

2,780,233

THROUGH CONDUIT GATE VALVE

Alexander S. Volpin, Houston, Tex.

Application March 6, 1951, Serial No. 214,053

9 Claims. (Cl. 137—315)

This invention pertains to gate valves such as are commonly used for controlling the flow of fluid through a pipe line, for example a pipe line for the transportation of petroleum products (such pipe lines often being of large diameters, for instance 30 inches). To avoid any obstruction to the flow when the valve is fully open and to permit the free movement of a pipe cleaning appliance through the open valve, it is essential that the passage through the valve casing, when the valve is open, be at least as large and preferably of the exact diameter of the interior of the pipe and axially aligned with the latter, and free from shoulders, pockets or other elements which might interfere with the free movement of the fluid or of a pipe cleaning appliance through the valve casing. Valves of this general type, wherein the orifice or flow-passage through the valve gate, when the valve is wide open, is of the same diameter as, and in effect, an axial continuation of the conduit defined by the pipe, are commonly known in the trade as "through" conduit valves.

In most prior valves of this general type the gate moves upwardly to open position from a chamber in the lower part of the valve casing. Since the gate may remain in this open position for a long period of time, rust or sediment may gradually accumulate in said chamber, making it difficult, if not impossible, to move the gate down into the chamber when attempting to close the valve. Moreover, since the valve casing may be of large dimensions, the secure anchorage and sealing of the bonnet or cover to the valve casing proper presents difficulties not encountered in valves of smaller dimensions.

In my copending application for Letters Patent Serial No. 66,260, filed December 20, 1948, Patent No. 2,660,191 of Nov. 24, 1953, there is disclosed a novel through-conduit gate valve wherein the valve gate moves downwardly in opening, thereby substantially eliminating the possibility of obstruction to its movement by reason of the accumulation of sediment; said application also discloses a novel bonnet construction providing for adequate anchorage and sealing of the bonnet, but so constructed as to facilitate removal of the bonnet from the casing when desired, regardless of the size of the parts or the period of time during which they have been assembled.

The present invention concerns certain improvements in gate valves of the general type described in the above application.

The present invention has for a primary object the provision of an improved arrangement for replacing under line pressure, a stem packing in a rising stem gate valve, and more particularly an auxiliary sealing means carried by the stem and a portion of the stem-receiving bore operable to form a metal-to-metal seal about the stem in response to selected rotational movements of the stem.

Fig. 3 is a fragmentary section, on the same plane as that of Fig. 1, illustrating the lower portion of the valve structure, the gate being in the open position;

Fig. 4 is an elevation of the gate of the valve of Fig. 1 removed from the casing, looking in the direction of fluid flow, the upper part of the gate being in section and the lower portion of the actuating stem being shown;

Fig. 5 is a section on the line 5—5 of Fig. 4;

Fig. 6 is a vertical section in a plane perpendicular to the axes of the valve seats and through the axis of the stem, the packing gland and the upper part of the stem being omitted, the gate being shown raised to its maximum elevation in preparation for replacement of the stem packing.

Figures 1, 2:
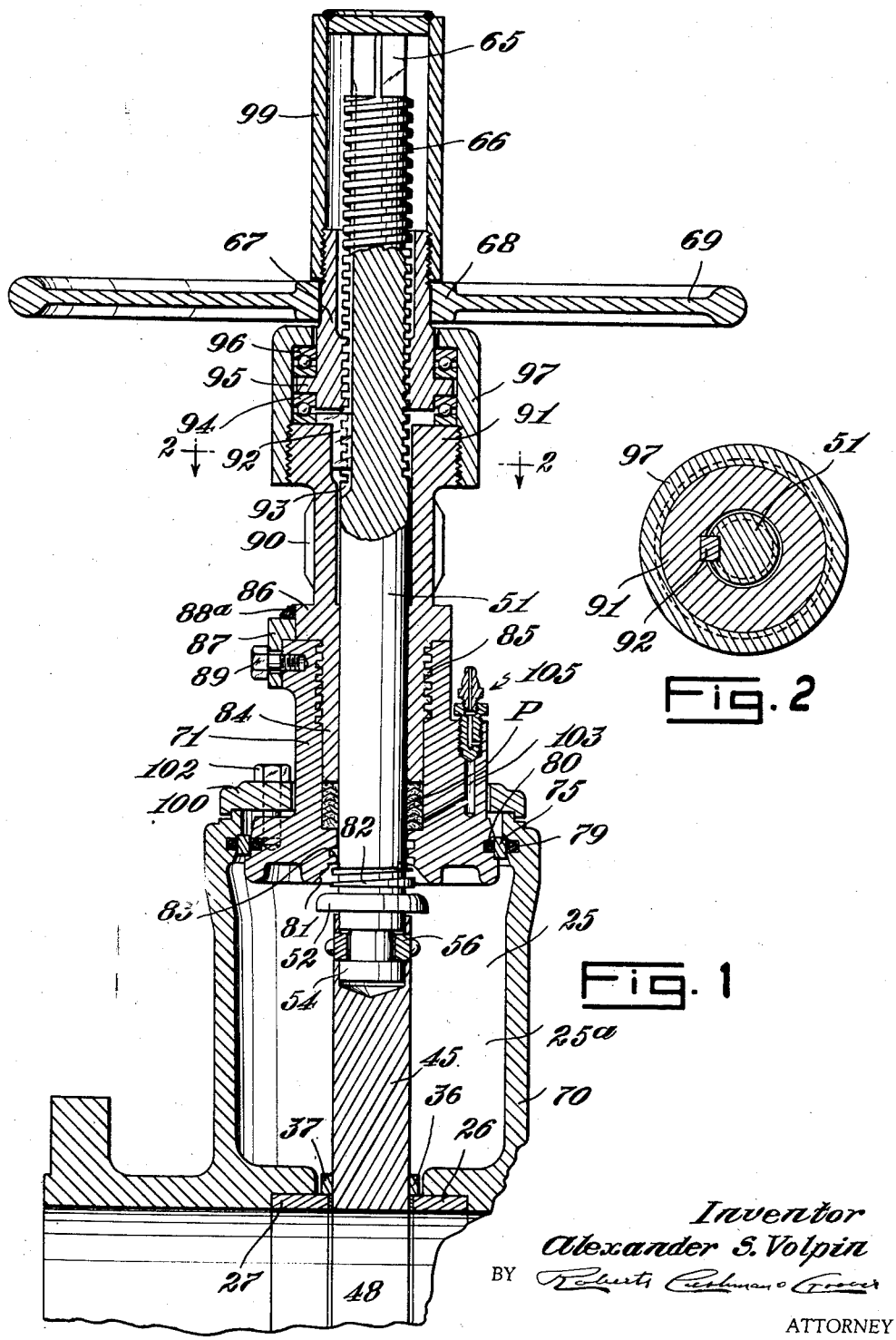
Fig. 1 is a fragmentary section, in the vertical plane of the axes of the valve seats, illustrating the upper portion of a rising-stem gate valve in accordance with the present invention, the gate being in open position.
Fig. 2 is a section on the line 2—2 of Fig. 1.

Referring to the drawings, the numeral 20 (Fig. 3) designates the valve casing. This casing will usually be a casting of unitary construction having attaching flanges 21 and 22 at its opposite ends for connecting the casing into a pipe line and having the axially aligned inlet and outlet passages 23 and 24. These passages open into a gate chamber 25 which is of a width, axially of the flow passage, sufficient to receive the gate. The inner ends of the passages 23 and 24 are defined by rigid seat rings 26 and 27 which, for example, may be of a harder material than that employed in making the casing proper and which are here shown as set into the material of the casing, for instance, by being forced in or shrunken in place. The inner diameters of these rings are the same as those of the passages 23 and 24 so as to avoid any ridge or depression where the rings are joined to the casing. As here illustrated the opposed edges of the rings 26 and 27 are furnished with seats 28 and 29 of a hard, wear-resistant material such, for example, as Stellite, the opposed faces of these Stellite members being ground accurately smooth and parallel and perpendicular to the axes of the rings. As illustrated in Fig. 3, the rings 26 and 27 project inwardly beyond the adjacent surfaces 32 and 33 of the casing proper, thus providing centering elements for the guard plates 34 and 35 (Fig. 3).

These guard plates (Fig. 3) are of rigid material, for example steel or bronze, each having a substantially annular upper portion 36 and 37, respectively (Fig. 3) defining apertures 38 (Fig. 6) of a diameter slightly greater than the external diameters of the rings 26 and 27 so that these annuli 36 and 37 may be slipped over the projecting portions of the rings 26 and 27 and have freedom of motion axially of the rings 26 and 27. These guard plates 34 and 35 have parallel, vertical edges extending downwardly from their annular portions and, as shown in Fig. 6, the guard plates preferably terminate in arcuate lower edges 35ˣ. The lower portions of these plates extend down into a chamber 88 within the lower portion of the casing which receives the lower part of the gate when the gate is closed.

The gate 45 (Fig. 4) is a unitary piece of rigid material of generally rectangular contour and of uniform thickness, having accurately parallel outer faces spaced apart a distance approximating the distance between the seat surfaces of the rings 26 and 27, but with some clearance to provide for slight motion of the gate in the direction of the axes of the rings 26 and 27.

The upper portion of the gate 45 is imperforate and constitutes the closure portion of the gate. The lower part 47 (Fig. 4) of the gate 45 is provided with an orifice or flow passage 48 of a diameter substantially equalling the diameter of the passage through the seat rings 26 and 27.

The guard plates 34 and 35 are held in firm but yielding contact with the opposite faces of the gate 45 by C-shaped springs S (Figs. 3 and 6) which embrace the edges of the gate and both guard plates and whose ends engage and preferably seat in recesses R' (Fig. 6) in the outer faces of the guard plates. These springs S exert force solely against the guard plates, urging them toward each other and as the springs do not touch or exert force against any fixed part of the casing, the guard plates and the gate (sandwiched between them) are free (so far as these springs S are concerned) to move bodily in the direction of the axis of the valve seat. Thus the gate is free at all times to make leak-tight contact with the seat in response to line pressure even though the pressure be low.

The upper end of the gate (Fig. 4) is provided with a vertical bore 49 and with a transverse slot 50 (Fig. 5) intersecting the bore and which is of a horizontal width greater than the diameter of the bore 49 and which extends through the entire thickness of the gate.

The valve actuating stem 51 (Fig. 4) is provided, near its lower end with a radial shoulder 52 below which are axially spaced radial flanges 53 and 54 separated by a spindle portion 55 of smaller diameter. The flanges 53 and 54 are of a diameter such that they may be slid down into the bore 49 in the upper end of the gate until the spindle portion 55 is in horizontal registry with the slot 50 in the gate. For holding the stem in assembled relation to the gate there are provided two clamping blocks 56 (Fig. 5) each of a thickness equal to half the thickness of the gate and each of such dimensions as to fit within the slot 50. Each of these blocks 56 is provided with a semi-circular recess 57. In assembling the parts, the lower end of the stem is seated in the bore 49 and the blocks 56 are introduced from opposite sides of the gate into the slot 50 so that the combined recesses 57 of blocks 56 embrace the spindle portion 55 of the stem. The blocks 56 are then permanently united by pins 58 (Fig. 5) which pass through aligned openings in the parts 56. With this arrangement the gate in free to swivel relatively to the stem 51.

Each of the vertical edges of the gate is provided with a longitudinal groove 60 and 61, respectively (Figs. 4 and 5), and these grooves receive vertical guide bars 62 and 63 (Fig. 6) arranged within the casing and which may be fixed in position in any desired manner, for example, by the plug welds 64 here illustrated. While these bars 62 and 63 might be integral portions of the casing proper, it is preferable to make them as separate elements and of a harder, more wear-resistant material, and to secure them in place in the casing by welding or other appropriate means. As illustrated in Fig. 4, the groove 60, for example, which receives the guide bar 62, is of somewhat greater width than the bar 62 so that it is possible for the gate to move bodily to a slight extent in the direction of fluid flow and likewise to rotate to a slight amount about the axis of the valve stem, such motion of the gate making it possible for the gate to seat, leak-tight even though the valve casing may be slightly distorted, due to stresses imposed by the pipe line or changes in contour due to temperature variations.

As illustrated in Fig. 6, each guide bar 62 and 63 is provided with one or more recesses 62$^a$ for the reception of the bow-portion of one of the springs S.

The upper end of the stem 51 is squared at 65 (Fig. 1) for the reception of a wrench by means of which the stem may at times be turned, and, below this squared portion, the stem is provided with an external screw thread 66 which engages an internal screw thread in a sleeve 67. This sleeve has a polygonal portion which recives a similarly shaped opening in the hub 68 of a hand wheel 69 by means of which the sleeve 67 may be rotated, thereby to move the stem 51 up and down.

A removable bonnet 71 (Figs. 1 and 6) is normally disposed within the upper part of the casing, the lower portion of this bonnet having a flange whose outer cylindrical, peripheral surface 72 (Fig. 6) is of a diameter slightly less than the inner diameter of the wall 73 of the opening at the upper end portion of the casing, so that the bonnet may be moved down through this opening until it occupies the position shown in Figs. 1 and 6. The bonnet has a horizontal annular surface 74 (Fig. 6) at the upper terminus of the cylindrical surface 72 and on this horizontal surface 74 there normally rests a sealing ring 75 (Figs. 1 and 6) of rigid, but somewhat resilient, material, for instance steel, having finished upper and lower sealing surfaces. The upper surface of this sealing ring engages a horizontal annular surface 74$^a$ (Fig. 6) of the casing when the parts are assembled, while its lower surface rests upon the horizontal annular surface 74 of the bonnet flange. As here illustrated (Fig. 6) the upper part 76 of the casing and the lower part of the bonnet 71 are furnished with opposed annular recesses 77 and 78 respectively, so located as to be on opposite sides of the sealing ring 75 when the latter is in place, and in these recesses 77 and 78 are arranged O-rings 79 and 80 (Fig. 1) of soft, resilient material, for example rubber.

The bonnet 71 is provided at its underside with a beveled annular surface 81 (Fig. 1) which constitutes a lower abutment and back seat which is engageable by the radial flange 52 (Figs. 1 and 6) carried by the stem 51. Contact of the parts 81 and 52 substantially prevents pasage of fluid up into the bonnet structure.

Above the flange 52 (Fig. 1) the stem is provided with an external screw thread 82 and just above the bevel face 81 the bonnet is provided with an internal screw thread at 83 (Fig. 1) engageable, at times, by the screw thread 82 on the stem.

Above the screw thread 83, the bonnet is provided with an axial bore of a diameter greater than that of the stem, this bore providing an annular chamber C' (Fig. 6) for the reception of packing P (Fig. 1) the packing here shown being of the chevron type. A gland 84 (Fig. 1) is arranged in the upper part of the packing chamber C', the gland having external screw threads at 85 for engagement with screw threads 85$^x$ (Fig. 6) on the interior of the upper tubular part of the bonnet structure 71. Above the screw threaded portion of the gland, the later is provided with a radial flange 86 (Fig. 1) which overlaps the upper edge of the bonnet structure, and to this flange there is attached a retaining lug 87, for example, by means of welding at 88$^a$, the lug having an opening for the reception of a screw 89 having threaded engagement with a bore in the side of the bonnet. This screw locks the gland in assembled relation to the bonnet after the packing has been placed in the stuffing box chamber C'.

Above the flange 86 (Fig. 1) the gland 84 is provided with a polygonal portion 90 for the reception of a wrench, and above this with a radial flange portion 91 which is externally screw threaded and which is provided at its interior with a slot for the reception of a key 92 which engages a keyway in the stem 51 thereby normally locking the stem against rotation relatively to the gland. An anti-friction bearing 94 rests upon the upper face of the part 91 and on this bearing rests a radial flange 95 projecting from the sleeve 67 above described. A housing 97 of inverted cup-shape has screw threaded engagement with the externally screw threaded part 91 of the gland, this housing 97 protecting the anti-friction bearings 94 and 96 from dirt and dust.

The upper end of the sleeve 67 is externally screw threaded at 98 and a cap 99, having screw threaded engagement with this portion of the sleeve, houses the upper end portion of the stem so as to protect the screw threaded portion of the stem from dirt and moisture. A bore 103 (Fig. 1) in the bonnet communicates with the lower part of the backing chamber C' and the upper end of this bore is enlarged and screw threaded to receive a conventional high-pressure bleeder and lubricating fitting 105.

Assuming that the guide bars 62 have been fixed in place within the casing, the springs S are put in place with their bends within the lower parts of the recesses 62ª of the guide bars. The annular portions 36 of the guard plates 34 and 35 are then slipped over the respective seat members 26 and 27 and so positioned that the ends of the springs S enter the recesses 55ª in the outer faces of the guard plates 34 and 35. After assembling the stem with the gate, the latter is introduced between the guard plates 34 and 35 and moved downwardly until its lower edge contacts the abutment 88ˣ.

The bonnet 71 is now slipped down along the stem and into the opening at the top of the casing, the soft rubber O-rings 79 and 80 having first been put in place. The sealing ring 75 is now deformed sufficiently to permit it to be passed down through the opening in the upper end of the casing (defined by the cylindrical wall 73) and is then permitted to resume its normal circular shape and placed with its lower edge on the annular shoulder 74 on the bonnet. A cover ring 100 (Fig. 1) is now put in place and its attaching bolts 102 are tightened, thus drawing the bonnet up until a pressure-tight seal is formed between the ring 75 and the opposed horizontal surfaces at 74 and 74ª.

The packing P is now placed about the stem and the gland 84 is screwed down into the upper part of the bonnet by the application of a wrench to the part 90. After the gland has been tightened, it is locked in place by means of the screw 89. The key 92 is now inserted so as to keep the stem from rotating relatively to the gland; the lower, anti-friction bearing 94 is put in place; the sleeve 67 is screwed down until its flange 95 rests upon the bearing 94; the upper anti-friction bearing 96 is put in place, the housing 97 is screwed down onto the upper part 91 of the gland; the hand wheel 69 is slipped down over the stem until its hub engages the polygonal portion of the sleeve 67; and the cap 99 is screwed down onto the upper end of the sleeve 67. With the parts thus assembled rotation of the hand wheel 69 turns the sleeve 67 and thereby moves the stem up and down, thus raising and lowering the gate 46.

In order to permit replacement of the packing while the gate is open and fluid under pressuree is flowing through the line, the screw 89 is first retracted and a wrench is applied to the part 90 to turn the gland 84. The stem and gland are so united by the key 92 that they cannot rotate relatively. Thus rotation of the gland turns the stem and also raises the stem so that the screw thread at 82 is brought into engagement with the screw thread 83 in the lower part of the bonnet. Approximately one turn of the stem thereafter raises the flange 52 into contact with the beveled seat surface 81 of the bonnet, thereby preventing leakage along the stem. To determine whether the flange is seated leak-tight, the pressure fitting 105 may be turned, and if there is any leakage into the bonnet chamber C' the fluid will escape from the pressure fitting, thus indicating that leakage is taking place. Assuming that the flange 52 is seated leak-tight, the cap 99, hand wheel 69 and the sleeve 67 are removed and the upper anti-friction bearing 96 is taken off. After removing the sleeve 67, the lower anti-friction bearing 94 is removed, the key 92 is withdrawn and a wrench is applied to the part 90 to turn the gland. Since the stem cannot now move upwardly because of the engagement of its flange 52 with the seat 81, rotation of the gland 84 now unscrews the latter from the bonnet, leaving the packing exposed. Pressure fluid may now be introduced through the fitting 105 to expel the packing, and after new packing has been installed, the parts may be re-assembled in the reverse order.

It is to be understood that the invention is broadly inclusive of any and all modifications falling within the scope of the appended claims.

I claim:

1. In a rising stem gate valve having a body, a gate and a gate stem reciprocable with respect to said valve body, an outward extension on said body about said stem, a packing chamber in said extension, stem sealing packing in said chamber, auxiliary cooperable sealing surfaces positioned on said stem and in said body to be normally held in axially spaced relation when the stem has attained the upper terminus of its normal non-rotative axial movement and engageable by limited additional axial movement of said stem relative to said body beyond said terminus, said additional axial movement being obtained by rotational movement of the stem relative to the body, and normally spaced-apart co-acting locking means positioned on said stem and body below said chamber and axially movable into engagement by said rotational movement of said stem relative to the body to lock said surfaces in sealing engagement.

2. In a rising stem gate valve having a body, a gate and a gate stem reciprocable with respect to said valve body, an outward tubular extension on said body about said stem, said tubular extension comprising a lower section and a separably attached upper section, a packing chamber in said lower section and stem sealing packing in said chamber, auxiliary cooperable sealing surfaces positioned on said stem and in said body to be normally held in axially spaced relation when the stem has attained the upper terminus of its non-rotative axial movement and engageable by limited additional axial movement of said stem relative to said body beyond said terminus, said additional axial movement being obtained by rotational movement of the stem relative to the body, and normally spaced apart co-acting locking means positioned on said stem and body below said chamber and axially movable into engagement by said rotational movement of the stem relative to the body to lock said surfaces in sealing engagement.

3. In a rising stem gate valve having a body, a gate and a gate stem reciprocable with respect to said valve body, an outward tubular extension on said body about said stem, said extension being separably connected to said body, a packing chamber in said extension and stem sealing packing in said chamber, auxiliary cooperable sealing surfaces positioned on said stem and in said body to be normally held in axially spaced relation when the stem has attained the upper terminus of its non-rotative axial movement and engageable by limited additional axial movement of said stem relative to said body beyond said terminus, said additional axial movement being obtained by rotational movement of the stem relative to the body, and normally spaced-apart co-acting locking means positioned in said stem and body below said chamber axially movable into engagement by said rotational movement of the stem relative to the body to lock said surfaces in sealing engagement.

4. In a rising stem gate valve having a body, a gate and a gate stem reciprocable with respect to said valve body, an outward extension on said body about said stem, a packing chamber in said extension, stem sealing packing in said chamber, auxiliary cooperable sealing surfaces positioned on said stem and in said body to be normally held in axially spaced relation when said stem has attained the upper terminus of its normal non-rotative axial movement and engageable by limited additional axial movement of said stem relative to said body beyond said terminus, said additional axial movement being obtained by rotational movement of the stem relative to the body, and separable spaced-apart co-acting locking means positioned on said stem and body below said chamber, said locking means comprising mated inclined plane surfaces engageable by rotation of the stem relative to the body to impart said limited additional axial movement of the stem relative to the body.

5. An arrangement to replace under line pressure the stem packing in the packing chamber of a valve having a reciprocable stem driving a fluid control member in said valve between upper and lower terminal positions across a fluid flow passage through the valve body, auxiliary and lockable sealing surfaces on said stem and body spaced apart in the absence of rotational movement of said stem and disposed below said packing chamber, and means preventing rotation of said stem during axial movement between the upper and lower terminal positions of said fluid control member, said means being releasable to permit rotational and additional axial movement of said stem to an extent sufficient to engage and lock said sealing surfaces in sealing position.

6. In a through conduit gate valve of the rising stem type, a stuffing box for said stem connected to the valve body, cooperable auxiliary sealing surfaces on the stem and body positioned below said stuffing box and in the absence of rotational movement of said stem in axially spaced relation, and complementary locking elements mounted on said stem and body between said stuffing box and said sealing surfaces in the absence of rotational movement of said stem in axially spaced apart relation, said elements being engageable by said rotational and limited axial movement of said stem relative to said body to effect engagement of said sealing surfaces and to lock the same in sealing position.

7. An arrangement to replace under line pressure the stem packing in the packing chamber of a valve having a reciprocable stem driving a fluid control member in said valve between upper and lower terminal positions across the fluid flow passage through the valve body, auxiliary and lockable sealing surfaces on said stem and body spaced apart in the absence of rotational movement of said stem and disposed below said packing chamber, said lockable sealing surfaces including mated inclined plane surfaces engageable by limited rotational and axial movement of the stem relative to the body, and means preventing rotation of said stem during axial movement between the upper and lower terminal positions of said fluid control member, said means being releasable to permit limited rotational and additional axial movement of said stem to an extent sufficient to engage and lock said sealing surfaces in sealing position.

8. An arrangement to replace under line pressure the stem packing in the packing chamber of a valve having a reciprocable stem driving a fluid control member in said valve between upper and lower terminal positions across the fluid flow passage through the valve body, auxiliary and lockable sealing surfaces on said stem and body normally spaced apart and disposed below said packing chamber, said lockable sealing surfaces including complementary thread segments engageable by limited rotational and axial movement of the stem relative to the body, and means preventing rotation of said stem during axial movement between the upper and lower terminal positions of said fluid control member, said means being releasable to permit limited rotational and additional axial movement of said stem to an extent sufficient to engage and lock said sealing surfaces in sealing position.

9. An arrangement to replace under line pressure the stem packing in the packing chamber of a valve having a reciprocable stem driving a fluid control member in said valve between upper and lower terminal positions across the fluid flow passage through the valve body, auxiliary and lockable sealing surfaces on said stem and body constructed to be spaced apart in the absence of rotational movement of said stem and disposed below said packing chamber, and means including a key member slidably connecting the stem to the valve body for preventing rotation of said stem during axial movement between the upper and lower terminal positions of the fluid control member, said means being releasable to permit rotational and additional axial movement of said stem to an extent sufficient to engage and lock said sealing surfaces in sealing position.

References Cited in the file of this patent

UNITED STATES PATENTS

| | | |
|---|---|---|
| 1,667,203 | Harris | Apr. 24, 1928 |
| 1,692,177 | Knauf | Nov. 20, 1928 |
| 1,801,960 | Houser | Apr. 21, 1931 |
| 1,871,965 | Du Bois | Aug. 16, 1932 |
| 2,030,458 | McKeller | Feb. 11, 1936 |
| 2,109,042 | Bennett | Feb. 22, 1938 |
| 2,504,924 | Fennema | Apr. 18, 1950 |

FOREIGN PATENTS

| | | |
|---|---|---|
| 844,269 | France | of 1939 |